US 8,660,371 B2

(12) United States Patent
Tuganbaev (10) Patent No.: US 8,660,371 B2
(45) Date of Patent: Feb. 25, 2014

(54) ACCURACY OF RECOGNITION BY MEANS OF A COMBINATION OF CLASSIFIERS

(75) Inventor: Diar Tuganbaev, Moscow (RU)

(73) Assignee: ABBYY Development LLC, Moscow (RU)

( * ) Notice: Subject to any disclaimer, the term of this patent is extended or adjusted under 35 U.S.C. 154(b) by 791 days.

(21) Appl. No.: 12/775,445

(22) Filed: May 6, 2010

(65) Prior Publication Data

US 2011/0274345 A1 Nov. 10, 2011

(51) Int. Cl.
*G06K 9/62* (2006.01)
*G06K 9/34* (2006.01)
*G06K 9/00* (2006.01)
*G06K 9/68* (2006.01)
*G06K 9/70* (2006.01)

(52) U.S. Cl.
USPC ........... 382/228; 382/155; 382/160; 382/177; 382/181; 382/219; 382/224; 382/227

(58) Field of Classification Search
None
See application file for complete search history.

(56) References Cited

U.S. PATENT DOCUMENTS

| | | | |
|---|---|---|---|
| 5,394,484 A * | 2/1995 | Casey et al. | 382/159 |
| 5,825,925 A | 10/1998 | Baird et al. | |
| 5,832,108 A * | 11/1998 | Fukita et al. | 382/159 |
| 5,835,633 A * | 11/1998 | Fujisaki et al. | 382/187 |
| 5,970,171 A | 10/1999 | Baraghimian et al. | |
| 6,931,351 B2 * | 8/2005 | Verma et al. | 702/182 |
| 7,024,033 B2 | 4/2006 | Li et al. | |
| 7,031,530 B2 | 4/2006 | Driggs et al. | |
| 7,313,267 B2 | 12/2007 | Call et al. | |
| 7,343,362 B1 | 3/2008 | Flippen | |
| 7,356,187 B2 * | 4/2008 | Shanahan et al. | 382/224 |
| 7,362,892 B2 * | 4/2008 | Lewis et al. | 382/159 |
| 7,454,062 B2 | 11/2008 | Nishiyama et al. | |
| 7,519,217 B2 | 4/2009 | Liu et al. | |
| 7,529,403 B2 | 5/2009 | Ivanov | |
| 7,558,426 B2 | 7/2009 | Katoh et al. | |
| 7,570,816 B2 | 8/2009 | Bargeron et al. | |
| 2005/0286772 A1 * | 12/2005 | Albertelli | 382/224 |

OTHER PUBLICATIONS

Chellapilla, et al. "Combining multiple classifiers for faster optical character recognition", Proceeding DAS'06 Proceedings of the 7th international conference on Document Analysis Systems, 2006, pp. 358-367.*
Xu, et al. "Methods of combining multiple classifiers and their applications to handwriting recognition", Systems, Man and Cybernetics, IEEE Transactions on, 1992, p. 418-435.*

* cited by examiner

*Primary Examiner* — Matthew Bella
*Assistant Examiner* — Thomas Conway
(74) *Attorney, Agent, or Firm* — LeighAnn Weiland; Aditya Krishnan (57) ABSTRACT

In one embodiment, there is provided a method for an Optical Character Recognition (OCR) system. The method comprises: recognizing an input character based on a plurality of classifiers, wherein each classifier generates an output by comparing the input character with a plurality of trained patterns; grouping the plurality of classifiers based on a classifier grouping criterion; and combining the output of each of the plurality of classifiers based on the grouping.

28 Claims, 10 Drawing Sheets

ACCURACY OF RECOGNITION BY MEANS OF A COMBINATION OF CLASSIFIERS

TECHNICAL FIELD

The present disclosure relates to optical character recognition of printed, hand-printed, and hand-written characters.

BACKGROUND

Optical Character Recognition (OCR) systems are widely used. In an OCR system, as most errors occur at a character recognition stage, accuracy of recognition of individual characters is a pivotal factor. In order to achieve greater OCR accuracy, the number of errors in recognizing individual characters must be minimized.

To achieve better recognition accuracy, several different classifiers are used. Each classifier has its own set of ratings and scales. In an OCR system different classifiers can be used. These may include a raster classifier, a feature classifier, a structure classifier, etc. In order to recognize a character image, a classifier compares the image with a set of patterns. Generally, each classifier has its own set of character patterns. A pattern is a template of some character for a classifier. A classifier compares an image of unknown character with the set of patterns of all characters and estimates how much the image similar or dissimilar to one or another character. In fact, classifier may have several patterns for a single character.

For instance, there may be several patterns for character "a" like "a", "a", and etc. A classifier compares an image with the whole group of patterns for the character "a" but chooses the best coincidence (matching) and further takes into account only the one weight which was obtained for this best variant. The same process is performed with pattern groups of all others characters. Then only the best weights of each pattern groups are compared with each other to find out which character is represented at the image. Therefore, when it is a matter of weight which was obtained by comparing an image with a pattern of some character actually it is meant the best weight of the pattern group of that character.

Patterns are obtained by processing character images from a training image database. Said database base contains real images of different characters, which were selected for training a classifier. An example of image from the database usually is named a learning sample or sample image. The training image database may be used for different others methods of recognition quality improvement as well, including training of weight combining for several classifiers. But in these cases it is useful to employ another database, more specifically a database with images dissimilar to that ones, on which the patterns were trained.

A raster classifier compares a character image with a pattern by superimposing an image of the character on an image of its pattern. A degree of discrepancy is expressed by a number of differing pixels. To achieve an acceptable degree of accuracy with a raster classifier, the image should be pre-processed. Specifically, a size, a slant and a stroke width of the image should be normalized. For example, all character images can be reduced to the same size of 14×14 pixels. Patterns for each class of character are typically obtained by averaging the images of the corresponding character in a learning sample on which the raster classifier is trained. The raster classifier is easy to implement, works fast, and has a good tolerance of image defects. However, the accuracy of the raster classifier is relatively low. Another drawback of the raster classifier is its high sensitivity to changes in shape of the characters.

A feature classifier operates on the following principles. The features of a source image are computed and the image is converted into an N-dimensional feature vector. A type and a number of features are most important characteristics that determine quality of results obtained with the feature classifier. Next, the feature vector is compared with a set of pattern feature vectors. The comparison of each pair of feature vectors consists in computing a rating that describes a distance between points in an N-dimensional space, where a point is a geometrical representation of a feature vector. The major advantages of the feature classifier are the ease of implementation, good capability to make generalizations, good tolerance of changes in character shapes, low number of recognition failures, and high speed. A major disadvantage of the feature classifier is low tolerance of various image defects. Additionally, the features are computed independently, which results in loss of information about mutual positioning of the character elements. The feature classifier is a general name for a plurality of different classifiers, each using its own set of features.

A contour classifier is a kind of feature classifier. To extract the features, the contour classifier uses the contours (boundaries) that have been identified in the character image. Its operational principles, advantages, and disadvantages are the same as those of the feature classifier.

A structure classifier uses man-made character structural models, against which an image being recognized is compared. A character in a structure classifier is described by a set of structural elements such as a line, an arc, a circle and a dot; and allowed mutual positioning of the elements is defined by means of geometric relations such as a line angle, a length, an intersection of lines, and the like. Variables used in relations are attributes (length restriction, range of angles, deviation from direct line and etc.) and coordinates of characteristic character points, such as ends and extrema. A pattern specifies ranges of allowed values for the attributes of each structural element. In case of a line, for example, the range of possible angles and a maximum deviation from the straight line are specified. The relations are specified by means of fuzzy logical expressions. Structural character descriptions are characterized by a high degree of generalization and can achieve high recognition accuracy even for highly variable characters, which is particularly important in the case of hand-printed and hand-written characters.

Each classifier has its own set of ratings and features. This leads to a problem of combining the ratings obtained from the different classifiers. A further problem lies in obtaining a qualitative assessment of the recognizer. Specifically, the following problems may arise when combining classifiers: a) Different classifiers may have different quantitative scales. For example, a raster classifier may produce ratings on a scale from to 0 to 400 and an contour classifier may have a scale from 0 to 800. In this case, how would one compute an overall rating? b) Each classifier will recognize some characters better and some characters worse, which, in turn, may be successfully recognized by another classifier. How would these factors take into account when combining several classifiers? c) Disagreement quantitative scales that was obtained for different characters from the same classifier. Specifically, in case of difficult characters, for example, ("t" and "f", "e" and "c", "z" and "2"), a 30% match with the pattern, especially for hand-written characters, is considered a fairly good result which allows the classifier to reliably recognize the character. On the other hand, for simple characters ("x", "7", "A"), 30% is very low and, most likely, means that the character has been recognized incorrectly. For simple characters, a 70-80% match is considered a good result. Another problem is that one extra pixel for character A may mean something completely different than one extra pixel for character B.

DETAILED DESCRIPTION

Before describing in detail embodiments that are in accordance with the present disclosure, it should be observed that the embodiments reside primarily in combinations of method steps and system components related to combining different classifiers in an OCR system.

As used herein, relational terms such as first and second, and the like may be used solely to distinguish one module or action from another module or action without necessarily requiring or implying any actual such relationship or order between such modules or actions. The terms "comprises," "comprising," or any other variation thereof, are intended to cover a non-exclusive inclusion, such that a process, method, article, or apparatus that comprises a list of elements that does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Advantageously, the present disclosure provides a method and a system to combine several different classifiers to improve accuracy of an OCR system. Specifically, several classifiers are combined to benefit from advantages and characteristics of different classifiers. The proposed method is not in any way based on the operational principles of one or another classifier and therefore can be used to combine the ratings obtained with any type of classifiers.

Before the classifiers are combined, the classifiers are trained. Classifier training is a procedure of selecting classifier parameters on a basis of a training database of images so as to minimize the chances of a wrong decision. Particularly, it is selecting parameters for classifier character patterns, or training patterns. In the present disclosure it is assumed that all classifiers and patterns have already been trained by any known process. The described method is employed for weight combining training, where weights were obtained from different classifiers —such as classifiers 26 28 and 30 in FIG. 2. The described method is also employed after training for identifying these weights with a combined weight.

Figure 1:
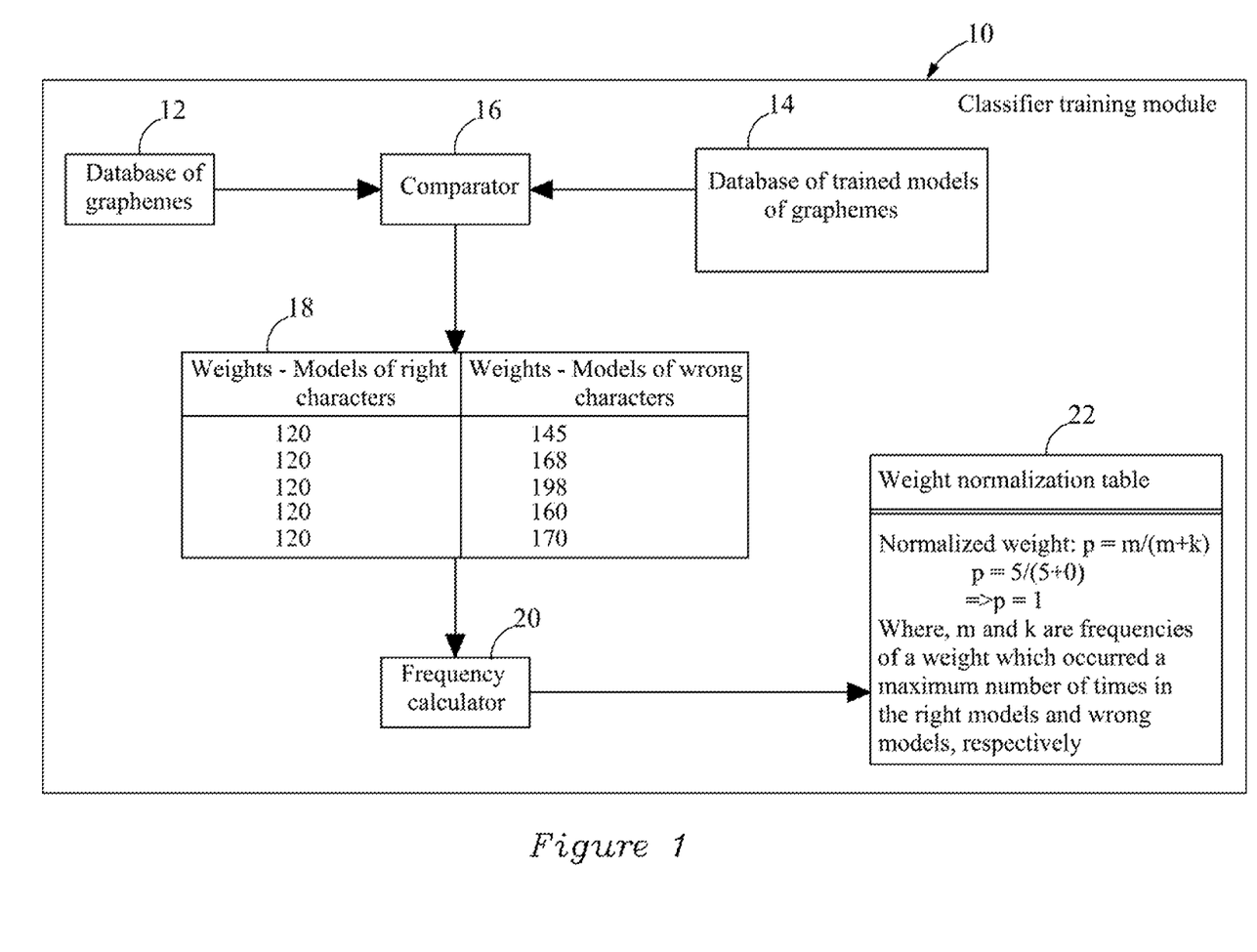
FIG. 1 shows a block diagram illustrating how to obtain a combined weight of classifiers after the combination training, in accordance with an embodiment of the present disclosure.

FIG. 1 is a block diagram of obtaining a combined weight of several classifiers for a character image in a recognition process, in accordance with one embodiment. But, before starting the recognition using a combined weight the system should be trained to combine classifier ratings.

Figure 4:
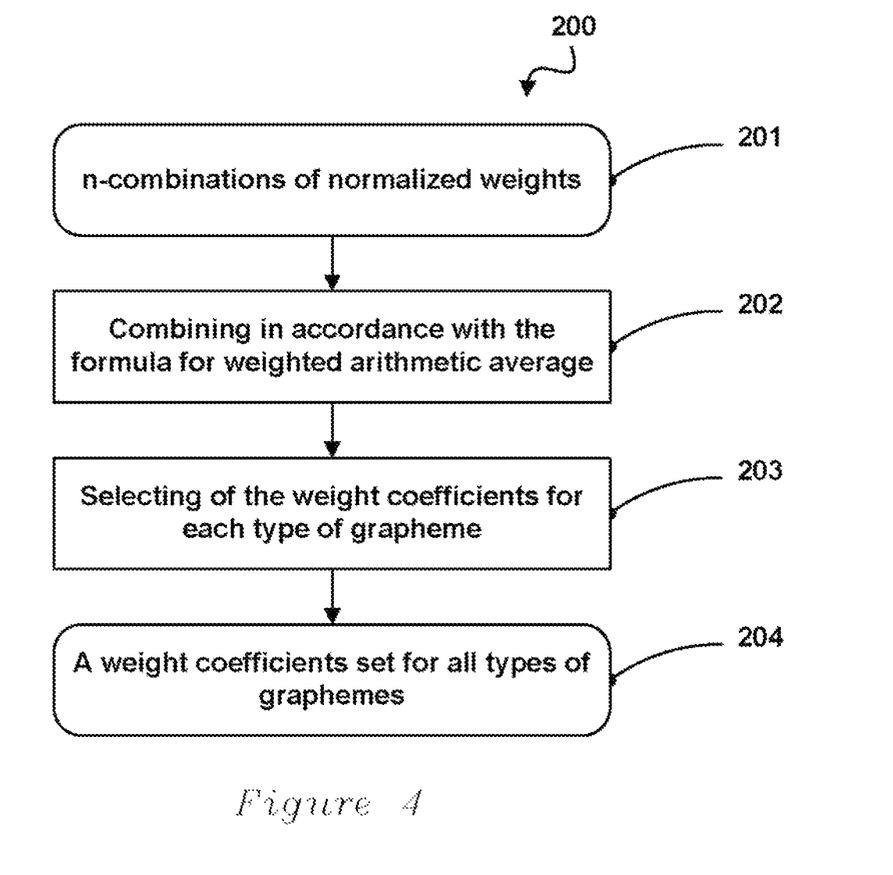
FIG. 4 shows a flowchart of a method for training a weight normalization table for an individual character pattern, in accordance with an embodiment of the present disclosure.

When obtaining a combined rating from a group of classifiers, a problem of different quantitative scales arises. For this reason, in the present disclosure, in one embodiment all ratings may be first reduced to a single scale in other words to be normalized. Normalization makes the combining more easy, particularly, the step of selecting coefficients at the step 203 (FIG. 4). However it is to be understood that normalization is an optional step. For normalization, a scale from 0 to 1 may be used. However any other scale that is convenient for the purpose may be used. Each classifier assigns a "normalized weight" to each character image, to replace a rating given to the image in accordance with the classifier's own scale. Therefore, it is to be understood that in this embodiment, the lower the normalized weight, the better the character image matches the pattern. However, the method can also use reverse weights which would mean that worse the image, the lower the normalized weight.

Figure 2:
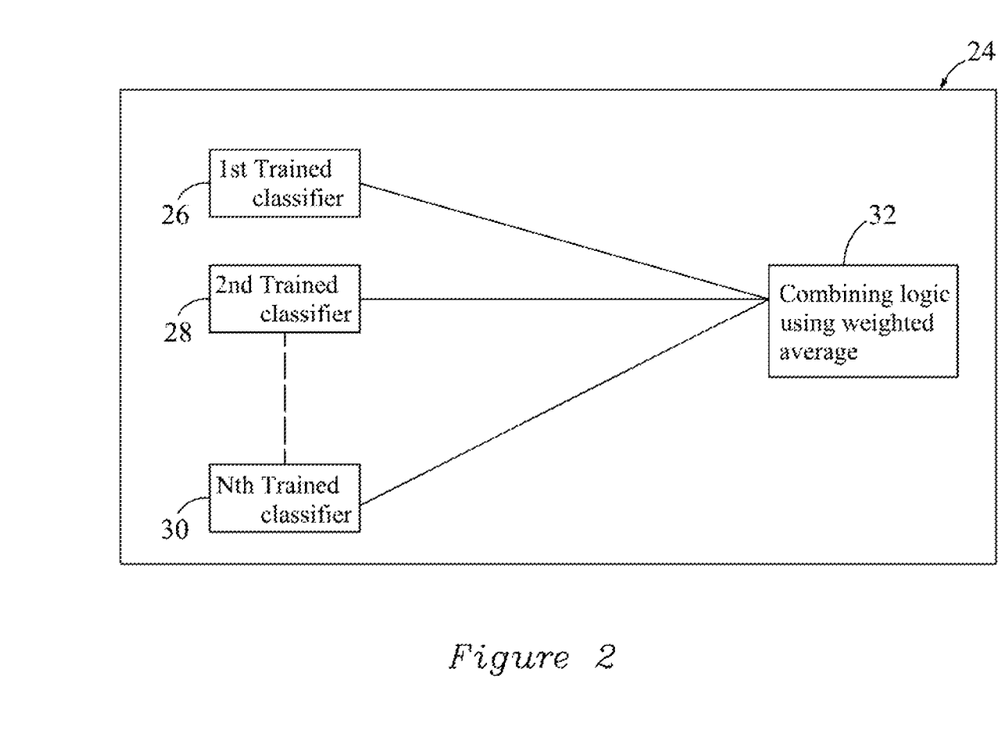
FIG. 2 shows a block diagram illustrating training a weight normalization table, in accordance with an embodiment of the present disclosure.

In one embodiment, shown in the FIG. 2, the weight normalization 32 of a certain pattern may be implemented on a basis of images of the same character. The normalized weight shows the place of a sample image among the other images of the same character in the image database. If the scale from 0 to 1 is used and there are N samples in the training image database representing a single character corresponding to a pattern (601), then the images are ordered (204) according to decreasing non-normalized weights, and the normalized weight $$\frac{k}{N}$$

is assigned to the sample with number k. Thereby a normalized weight of 0 is assigned to the best image in the database (or the image identical to the best image), whereas a the weight of 1 is assigned to the worst image. An "average" image, therefore, will generally have a weight of 0.5. Training module 24 is employed for each pattern individually for all classifiers. This method of normalization is fast and easy. But, there are other, more complex methods of normalization.

Figure 3:
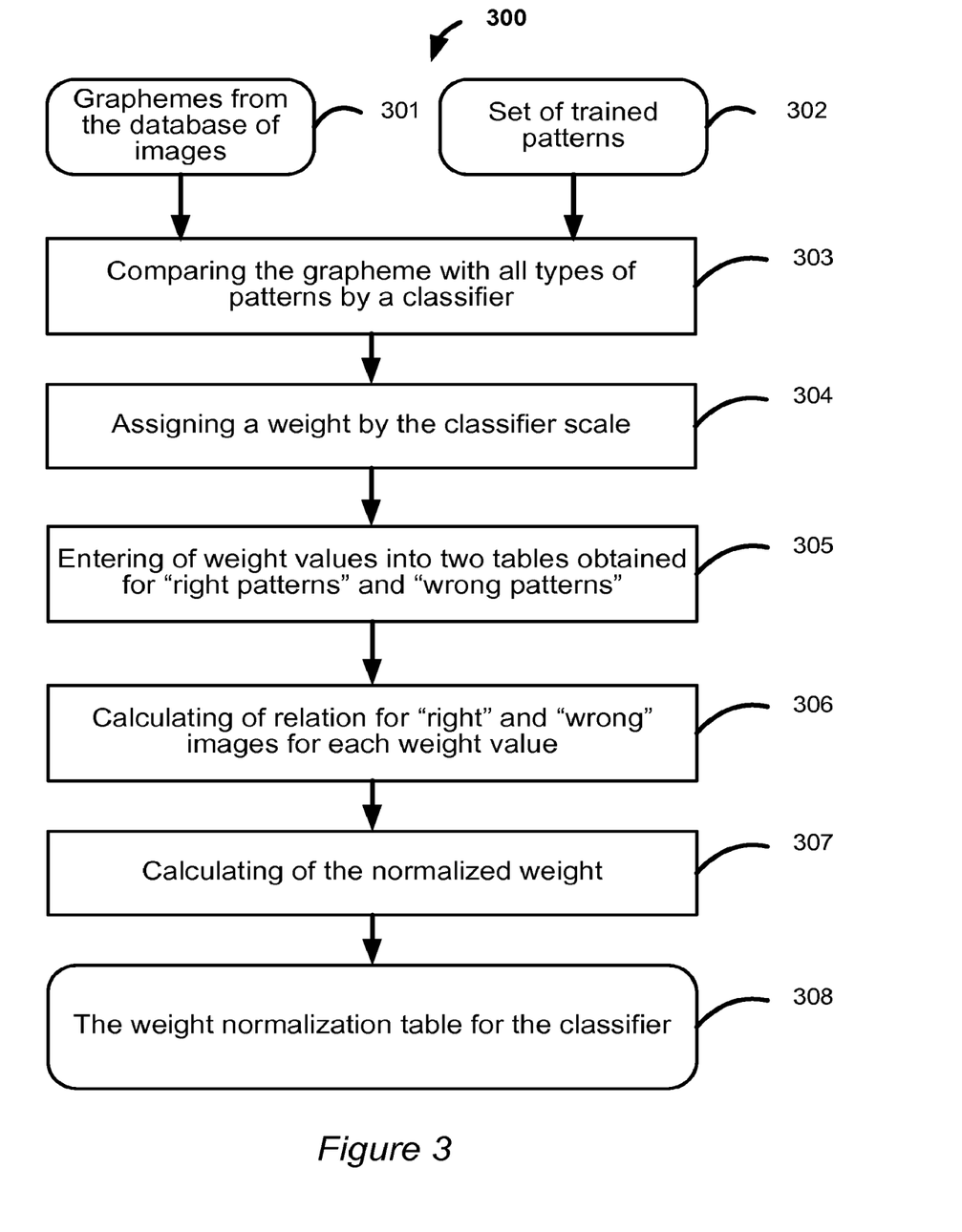
FIG. 3 shows a flowchart illustrating a method of training a weight normalization table, in accordance with an embodiment of the present disclosure.

The above-described method of normalization is fast and easy. But, there are the other, more complex methods of normalization. For example, FIG. 3 shows a block diagram of a weight normalization table training module that implements a more complex normalization procedure 300. The normalization training procedure 300 uses a set of trained patterns 301 and a database 302 of character images. The database 302 include images for all possible characters, and during training the system "knows" which pattern from the set 301 corresponds to which character images from the database 302. The quality of recognition or the ability to recognize a character becomes apparent only when one tests how well a classifier can distinguish a character from the other characters. When tests are done on a single character, the classifier only rates the quality of the images. Advantageously, in one embodiment, to assess the quality of recognition of a character, both "right" and "wrong" images are used to establish how well the classifier can distinguish right images between all others, as will be described.

In the present embodiment, based on a comparator's (16 in FIG. 1) output, the classifier assigns weight values according to its own scale as shown at 304 in FIG. 3. Specifically, all the weight values are obtained when recognizing the images from the database 302 based on the patterns 301. The weight values are entered into a weight table 305 having two columns: one includes weights obtained by comparing the patterns with the images of the right characters and the other includes weights obtained by comparing the patterns with the images of the wrong characters. This procedure is reiterated for each pattern to obtain for each pattern its own weight normalization table.

After the weight values are assigned, for each weight value (q) in both columns (for right and wrong images) of the table the number of samples with weight less than or equal to the weight value (q) is calculated. The number of samples in the column including right images (m) and the wrong images (k) is calculated using a calculator module at step 306. Subsequently, a normalized weight (p) is calculated, where $$p = \frac{k}{m+k}.$$

From these correspondences between the normalized weights and weight values on the classifier's own scale, a weight normalization table 306 is built. The weight normalization table 308 is built separately for each character pattern. In one embodiment, normalized weights are assigned by applying the weight normalization table 308 to weights based on the classifier's own scale. To factor in recognition peculiarities shown by different classifiers on different characters, the weight normalization table 308 is always built and trained separately for each character used by the classifier. Training is done separately for each classifier.

To make the weights of different characters comparable, it is to be determined which weight values of the given classifier more often correspond to correctly recognized characters and which weight values more often correspond to incorrectly recognized characters. This statistics is gathered as much as possible for the weight values that were obtained during the training recognition.

Referring now to FIG. 4, a flowchart of a method for training a weight normalization table of an individual character pattern for one of a plurality of classifiers is shown, in accordance with an embodiment of the present disclosure by means of module 10 of FIG. 1. Specifically, a set of trained patterns (302) of all possible characters from the database (14 in FIG. 1) and character images 601 from the database 301 (12 in FIG. 1) are compared by the classifier at step 303 using the comparator 16 shown in FIG. 1. Specifically, the pattern of the character is compared with images of the right character and all images of wrong characters and assesses the degree of discrepancy between the character pattern and each of the character images, assigning 304 a weight to each image according to its own scale. All the weight values that were obtained when recognizing the images from the database are entered 305 into the table having two columns: one includes the weights obtained by comparing the patterns with the images of the right character and those that were obtained by comparing the patterns with the images of the wrong characters—see table 18 in FIG. 1. At the training recognition stage, the "right" characters are known in advance.

Next, at the step 306 for each weight value (q) according to the classifier scale in both columns (for right and wrong images) of the table, the number of image samples with weight less than or equal to (q) is calculated. More specifically the number of image samples with weight less than or equal to (q) is calculated for the "right" images (m) and for the "wrong" images (k)—such as by the frequency calculator 20 in FIG. 1. Subsequently, a normalized weight (p) is calculated (307), where $$p = \frac{k}{m+k}.$$

The normalized weight p shows the likelihood that the character with this weight had been recognized incorrectly, the degree of discrepancy between the character image and the pattern. From these correspondences between the normalized weights and weight values on the classifier's own scale, the weight normalization table 308 is built—see table 22 in FIG. 1. The weight normalization table 108 is built separately for each type of character. Thus, the procedure 400 is repeated on all character patterns for each type of classifier.

Building a table as shown in the procedure 400 for each character pattern takes account of the fact that the same weight given by the same classifier to different characters may mean different things, whereas the normalized weight (e.g. 0.43) means roughly the same for character A as for character B. Advantageously, if this normalization approach is used, the operational principles of classifiers and their scales become irrelevant. The training normalization table in this way requires a large training database of images to reach a sufficient accuracy of the recognition. This is a universal approach which is used to normalize combined classifiers.

In another embodiment, if it is more convenient to have a lower normalized weight corresponding to an image that matches the pattern worse, the following formula can be used for normalization:

$$p = \frac{k}{m+k}$$

Figure 6:
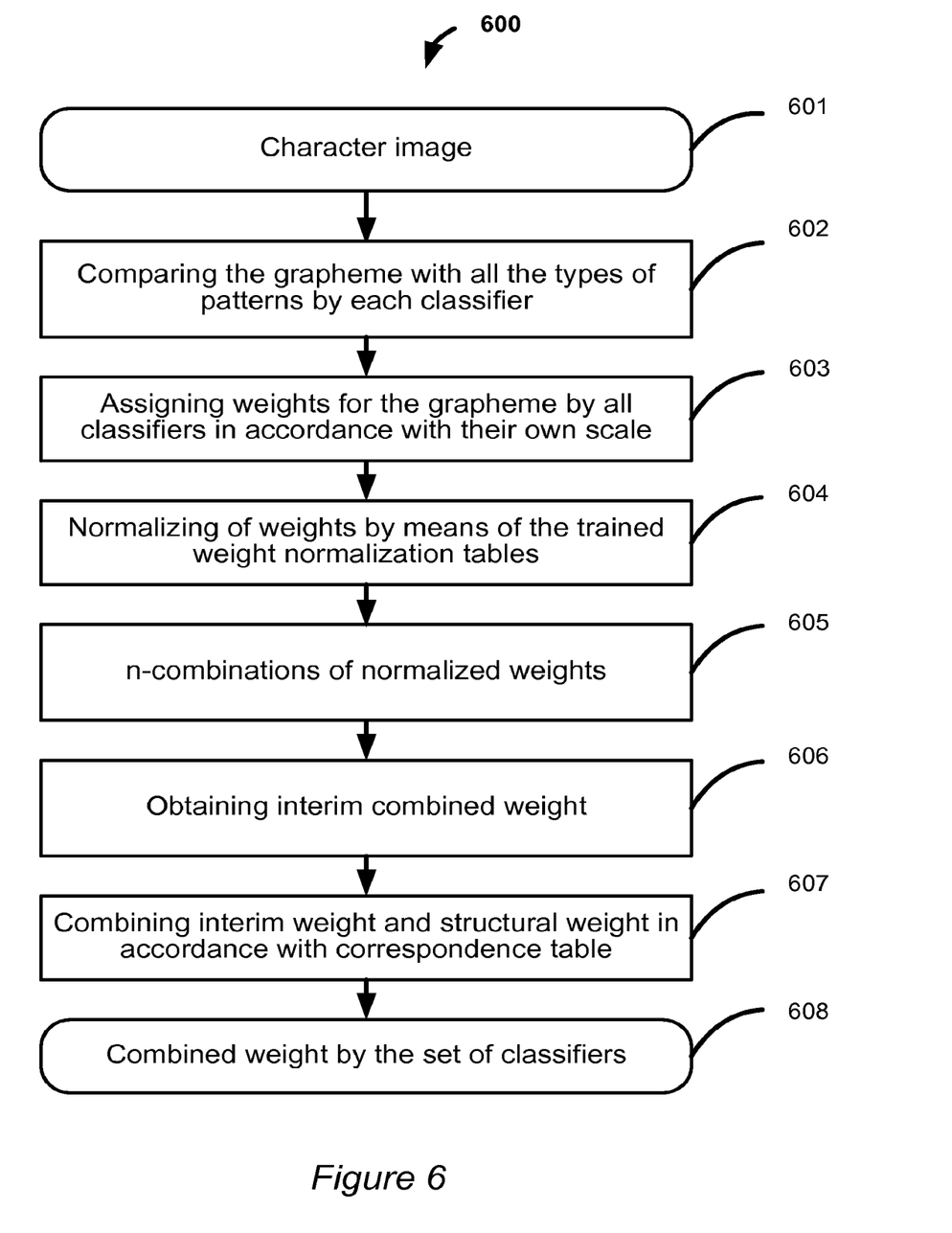
FIG. 6 shows a flowchart of a method of training in a first stage of combining classifiers, in accordance with an embodiment of the present disclosure.
Figure 7:
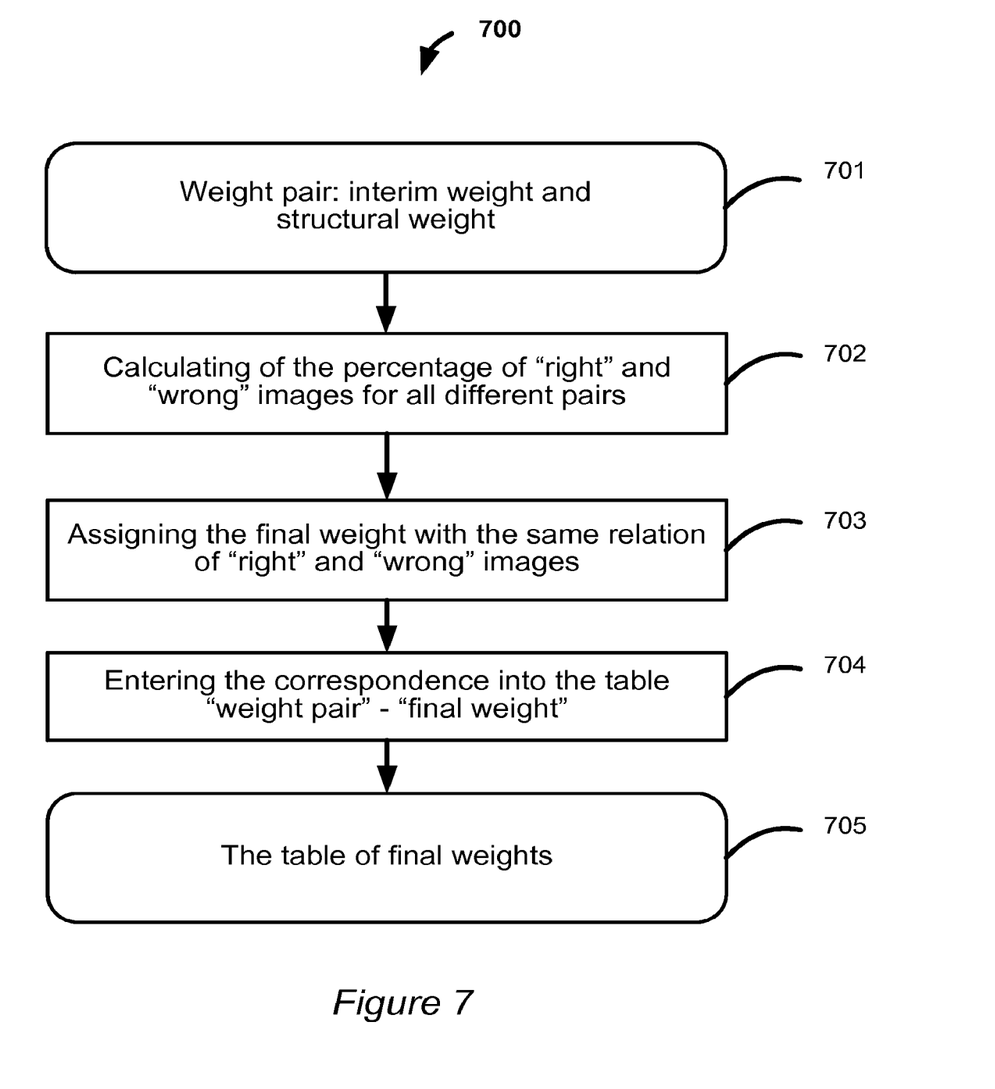
FIG. 7 shows a flowchart of a method of training in a second stage of combining classifiers, in accordance with an embodiment of the present disclosure.

Next, a process of combining the classifiers starts. The combining may carry out in one or two stages, viz. stages 1 and 2, depending on properties of classifiers to be combined. FIG. 6 shows the steps associated with stage 1, in accordance with stage 1, whereas FIG. 7 shows the steps associated with stage 2, in accordance with one embodiment.

At stage 1, shown on FIG. 6, all or a part of the classifiers are combined in accordance with a formula for the weighted arithmetic mean. At stage 2, shown on FIG. 7, the interim weight is combined with the weight of the remaining (or one of remaining) classifiers. If all classifiers were combined in one interim weight at stage 1, the combining ends after stage 1 is complete 600. Since classifiers of different type may fundamentally differ, the two-stage combining method is used in a recognition system to take advantage of different types of classifiers. Sometimes weights given by various types of classifiers are essentially different, and combining them together in accordance with the formula for the weighted arithmetic mean is not very efficient. Thus, classifiers of the same types are grouped and combined at stage 1 by means 600, and then at stage 2 interim weights calculated at stage 1 are pair wise combined with remaining classifiers (which were not combined at stage 1). Grouping classifiers may be performed in a variety of ways. For example, based on classifier type, nearest neighbor classifiers, may be grouped. Combining may be implemented by means of any combination of stages 1 and 2.

Figure 5A:
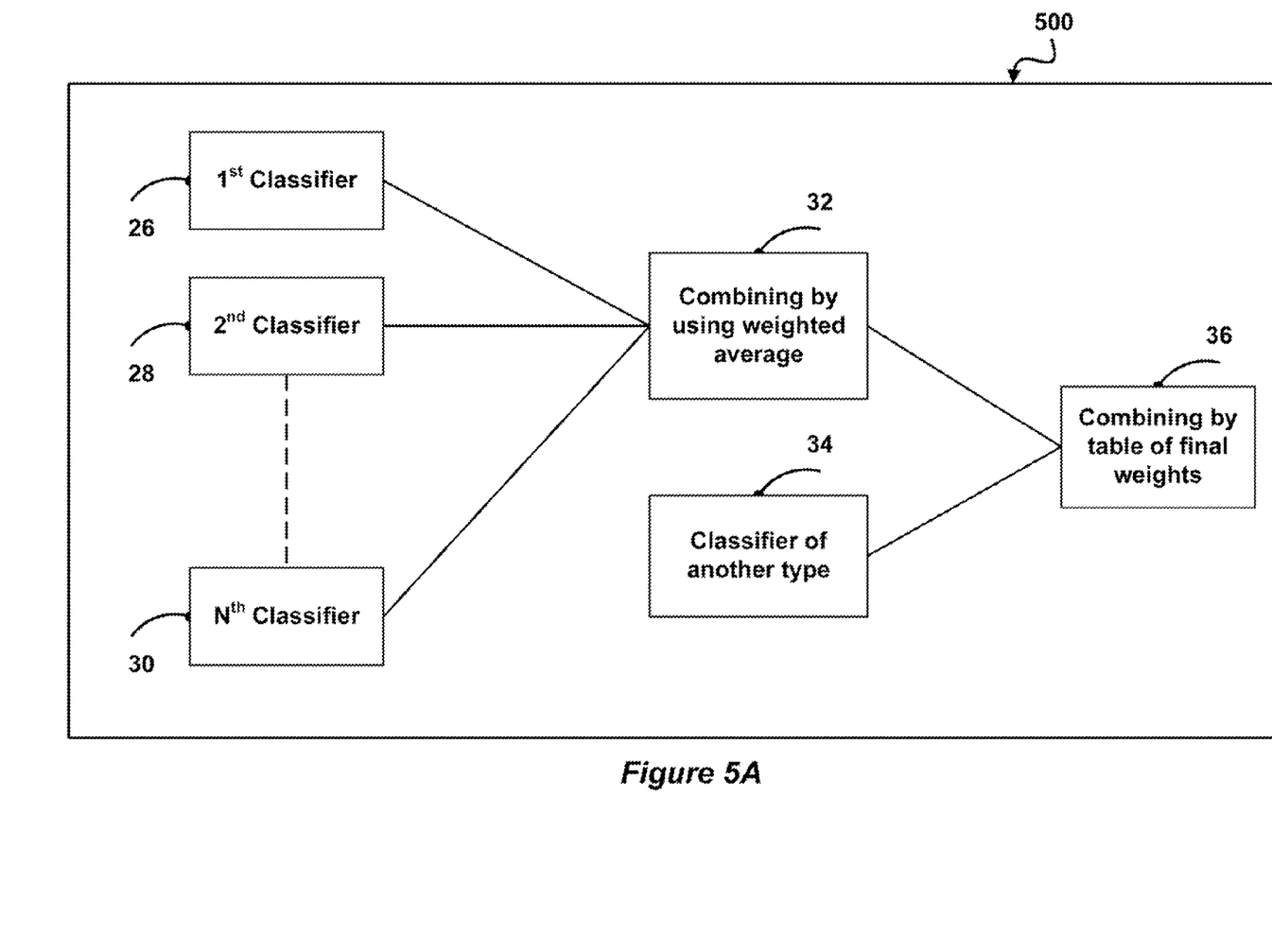
FIGS. 5a, 5b and 5c show block diagram illustrating different variants of combining a plurality of classifiers in an Optical Character Recognition system, in accordance with an embodiment of the present disclosure.
Figure 5B:
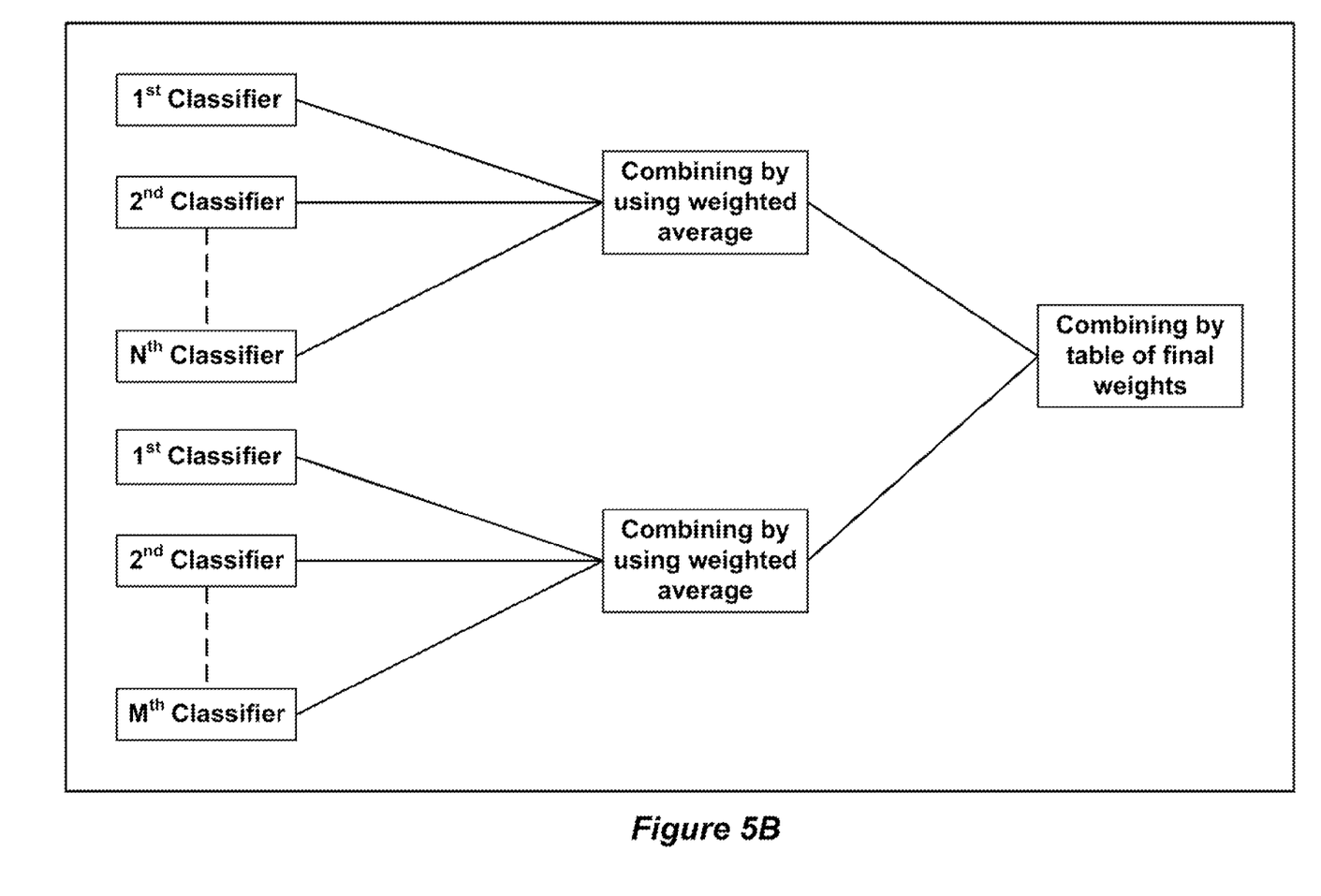
Figure 5C:
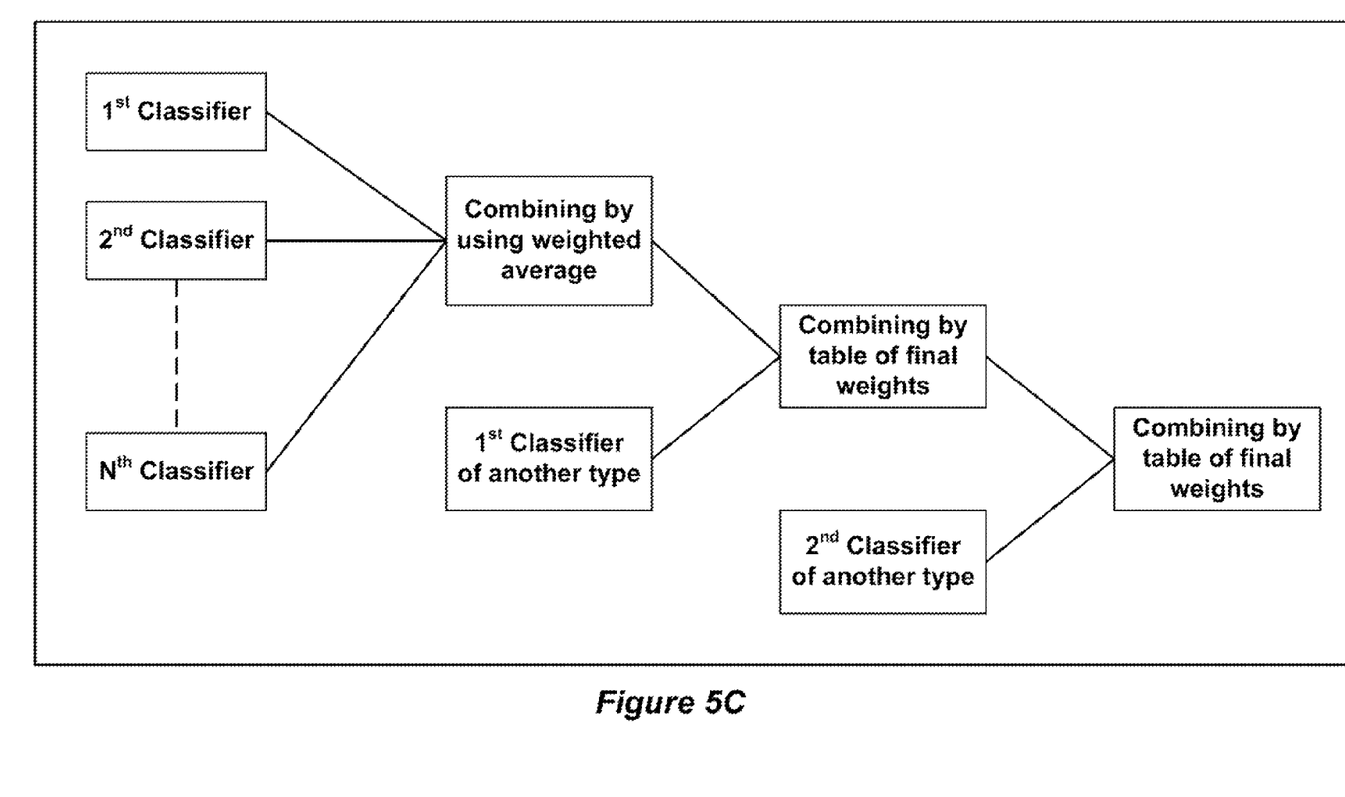

Referring now to FIGS. 5A, 5B and 5C, block diagrams illustrating some variations of combining a plurality of classifiers in an Optical Character Recognition (OCR) system is shown, in accordance with an embodiment of the present disclosure. In FIG. 5A is shown the OCR system includes a plurality of classifiers of the same type such as a 1$^{st}$ classifier 26, a 2$^{nd}$ classifier 28, an N$^{th}$ classifier 30 and a classifier of another type 34. At stage 1 outputs of the plurality of classifiers (28-30) are combined by using weighted mean 32. Then at stage 2 output of combining classifiers and output of classifier of another type 34 are combined by using a table of final weights 36. The classifiers are combined such that the OCR system 500 may benefit from the combination of the plurality of classifiers. In FIG. 5B is shown the OCR system with two classifier groups and both of them is combined by using weighted mean. Then both output of combining classifiers are combined by using a table of final weights. In FIG. 5C is shown the OCR system with one classifier group and two essentially different classifiers. Classifiers in the group are combined by using weighted mean; further output of combining classifiers and output of first classifier of another type are combined by using a table of final weights. Then output of last combining classifiers and output of second classifier of another type are combined by using a table of final weights.

Referring now to FIG. 6 for stage 1 combination. In one embodiment, for all character images in the image database, the present disclosure obtain n-combinations 601 of normalized weights $(x_1, x_2, \ldots, x_n)$, which is briefly termed as n-combinations below, where each weight corresponds to the rating given by one of the n classifiers. All the weight values for each type of character are also divided into two categories: n-combinations obtained for the "right" character images, and n-combinations obtained for the "wrong" images.

The combining 602 is done in accordance with the formula for weighted mean (arithmetic mean with weights) $x = a_1 x_1 + a_2 x_2 + \ldots + a_n x_n$. The weight coefficients $a_1, a_2, \ldots, a_n$ are selected 603 experimentally separately for each character so that the given weighted mean can best separate the images of the right characters from all others characters.

If $x_{ji}$ is the set of all weights (for one character j) obtained as a result of training for the "right" character images, then the best combined weight $$x_j = \sum_{i=1}^{n} a_i x_{ji}$$

is the one that is closest to 0. If $y_{ji}$ is the set of all weights (for the same character j) obtained for the "wrong" images, then the best combined weight $$y_j = \sum_{i=1}^{n} a_i y_{ji}$$

is the one closest to 1. For all $x_j$'s and $y_j$'s a general function is used. The function should have an extremum when $x_j$ are closest to 0 and $y_j$ are closest to 1. An example of such a function, in one embodiment of the invention, is $$f = \sum_j x_j^2 + \sum_j (1 - y_j)^2,$$

whose minimum meets the above criteria. Therefore the weight coefficients $a_i$ are selected so that f→min. In other embodiments of the invention, any other convenient functions may be used. The minimum (or maximum) of the applied function is computed by applying the gradient descent method. This procedure is repeated for each character, while the function type remains unchanged. In other words, finding the weight coefficients $a_i$ is turned into building a hyperplane f in n-dimensional space that (=hyperplane) separates the "right" character images from the "wrong" images. In this manner, for each character, a set of weight coefficients $a_i$ are computed in the course of training 604. When using a different normalizing method, the coefficients are selected in the same manner. If all classifiers were combined at this stage, the weight x is the final combined weight. Otherwise, the weight x is used as the interim weight at stage 2.

Referring now to FIG. 7 to understand combination of classifiers in stage 2. In stage 2, for all the characters, weight pairs $(x, x_{n+1})$ 701 can be obtained, where $x_{n+1}$ is a weight of a classifier of another type, which did not join in combining of first stage. Every character pattern is compared by the classifier with every character image from the training image database to obtain the weight $x_{n+1}$. Weight x for the same composition of the image and pattern for current character was obtained at stage 1. All the weight values of the weight pairs for each character are also divided into two categories. A first category comprises pairs obtained for the "right" images and second category comprises pairs obtained for the "wrong" images. For each weight pair, a percentage of "right" and "wrong" images is calculated 702 that received the weight pair. For each combination of interim and a weight of another classifier $(x, x_{n+1})$ the final weight w is selected 703 so that the combination of weights (w,w) has the same percentage of "right" and "wrong" images as the combination $(x, x_{n+1})$. The resulting correspondences $(x, x_{n+1})$–w are entered 704 into the table. In the case of rare pairs $(x, x_{n+1})$ the neighboring weight pairs may be used to calculate the final weight w. The training process 700 results in the table 705 of final weights. Once the training is complete, the combined classifier rating of a character is obtained by performing the steps shown in FIG. 6.

Referring now FIG. 6, a flowchart of a method of obtaining a combined weight of classifiers after the training is shown, in accordance with an embodiment of the present disclosure. Now, after a stage of recognition when the training of combining is complete the right character pattern of the recognized image is unknown and it is determined by an OCR system as result of the recognition. Specifically, each of the classifiers compares the character 601 with all of the available types of patterns at step 602 and assesses a degree of discrepancy between the image and the pattern, assigning a weight to each pattern at step 603. The weights are then normalized 604 by means of the weight normalization tables, built on all character types for each classifier. The normalized weights assigned to the character by all classifiers (which take part in combining of first stage) when comparing it with the patterns of the same character are n-combinations 605 of the normalized weights for the given character type. Next, all n-combinations of weights are combined 606 into one weight x in accordance with the formula: x=a.sub.1x.sub.1+a.sub.2x.sub.2+ . . . +a.sub.nx.sub.n, where a.sub.1,a.sub.2, . .

., a.sub.n are the coefficients that were selected during the training stage, each type of character having its own coefficients. Next, if the set of classifiers included a classifier of another type, which was not combined (e.g. a structure classifier), for each pair (x,x.sub.n+1) its combined weight w is selected 607 from the table. Thus a character is compared with every available pattern and is given a combined weight 608 by a combination of classifiers.

OCR systems often use classifiers of different complexity degree. One of them are simple and fast, they can easy identify some most appropriate variants of the recognition, but they can often be mistaken in a choice a right option among best ones. The others classifiers are complex in implementation and work slowly, but they work accurate and make a minimum of mistakes. So, for such combined systems it is reasonable at first to combine weights from the simple classifiers, and to select some best variants of recognition for each image being recognized according to this combined weight. Then, slow complex classifiers (one or more) may be applied, and the image being recognized may be compared at stage 102 with only some most appropriate patterns which were selected in a previous stage. It allows appreciably to reduce a time of the recognition. The weights provided by the complex classifiers may be combined only among themselves, or their combined weight may be combined in the way 700 with a combined weight provided by simple classifiers.

Figure 8:
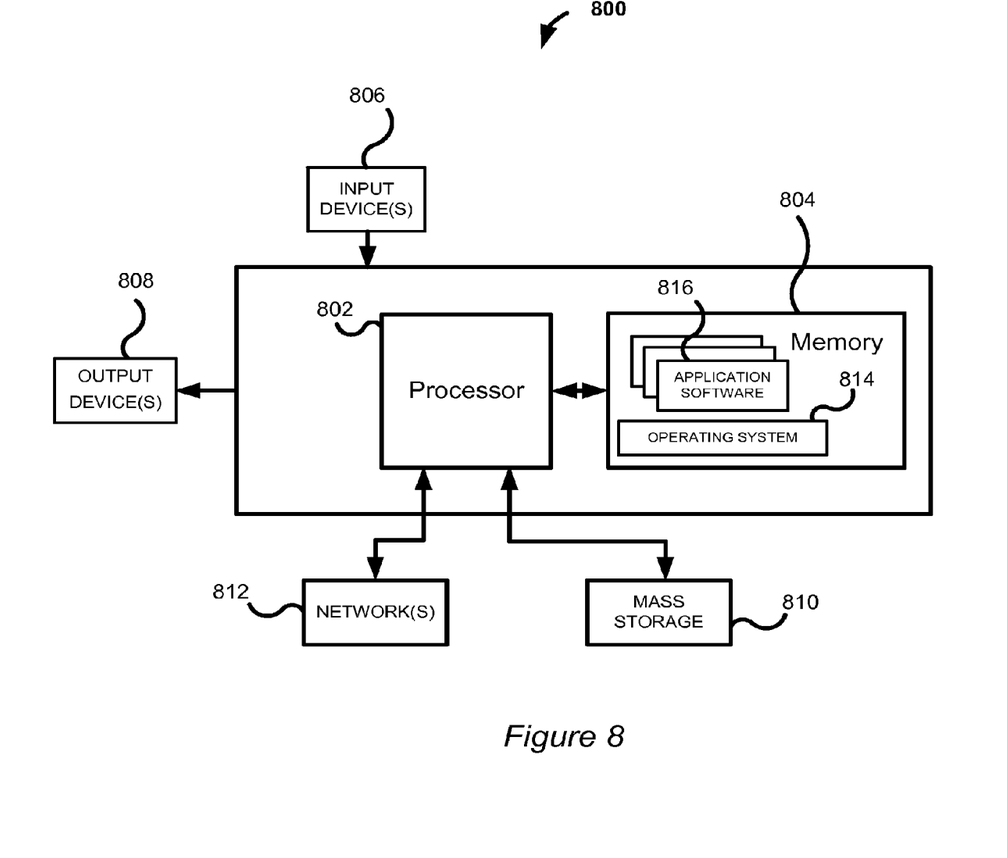
FIG. 8 shows an example of hardware that may be used to implement the techniques disclosed herein, in accordance with an embodiment of the present disclosure.

Referring now to FIG. 8, an example of hardware 800 that may be used to implement the techniques disclosed herein is shown, in accordance with an embodiment of the present disclosure. The hardware 800 typically includes at least one processor 802 coupled to a memory 804. The processor 802 may represent one or more processors (e.g., microprocessors), and the memory 804 may represent random access memory (RAM) devices comprising a main storage of the hardware 800, as well as any supplemental levels of memory e.g., cache memories, non-volatile or back-up memories (e.g. programmable or flash memories), read-only memories, etc. In addition, the memory 804 may be considered to include memory storage physically located elsewhere in the hardware 800, e.g. any cache memory in the processor 802, as well as any storage capacity used as a virtual memory, e.g., as stored on a mass storage device 810.

The hardware 800 also typically receives a number of inputs and outputs for communicating information externally. For interface with a user or operator, the hardware 800 may include one or more user input devices 806 (e.g., a keyboard, a mouse, a scanner etc.) and a display 808 (e.g., a Liquid Crystal Display (LCD) panel). For additional storage, the hardware 800 may also include one or more mass storage devices 810, e.g., a floppy or other removable disk drive, a hard disk drive, a Direct Access Storage Device (DASD), an optical drive (e.g. a Compact Disk (CD) drive, a Digital Versatile Disk (DVD) drive, etc.) and/or a tape drive, among others. Furthermore, the hardware 800 may include an interface with one or more networks 812 (e.g., a local area network (LAN), a wide area network (WAN), a wireless network, and/or the Internet among others) to permit the communication of information with other computers coupled to the networks. It should be appreciated that the hardware 800 typically includes suitable analog and/or digital interfaces between the processor 802 and each of the components 804, 806, 808 and 812 as is well known in the art.

The hardware 800 operates under the control of an operating system 814, and executes various computer software applications, components, programs, objects, modules, etc. indicated collectively by reference numeral 816 to perform the techniques described above.

In general, the routines executed to implement the embodiments of the invention, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others.

Although the present invention has been described with reference to specific exemplary embodiments, it will be evident that the various modification and changes can be made to these embodiments without departing from the broader spirit of the invention. Accordingly, the specification and drawings are to be regarded in an illustrative sense rather than in a restrictive sense.

I claim:

1. A method for an optical character recognition (OCR) system, the method comprising:

training each of a plurality of classifiers by selecting separately for each of a plurality of characters weight coefficients for a weighted mean;

recognizing an input character based on the plurality of classifiers;

generating from each classifier an output by comparing the input character with a plurality of training patterns;

grouping the plurality of classifiers based on a classifier grouping criterion; and combining the output of each of the plurality of classifiers based on the grouping, wherein combining the output of classifiers further comprises:

combining a weight output by each classifier into an interim weight in accordance with a formula for a weighted mean, using a formula for calculating the weighted mean which is selected for each character on a basis of a preliminary training process based upon the plurality of training patterns, and subsequently combining the interim weights from the calculated weighted mean with corresponding determined classifiers so as to provide a complete combined final set of weighted classifiers.

2. The method of claim 1, wherein the classifier grouping criterion includes a measure of a similarity between the classifiers.

3. The method of claim 1, wherein the combining a weight output by each classifier of at least one same type group into at least one interim weight in accordance with a formula for a weighted mean is performed as part of a first stage, wherein the interim weight is a final weight in a case of there being only one type group at the first stage, and wherein there is no second stage.

4. The method of claim 1, wherein the combining comprises a second stage in which each interim weight is combined with one of a further weight output by a classifier of a second type and another interim weight, wherein the second stage is performed multiple times in which case for each additional time, and wherein the interim weight is the output of a last performance of the second stage.

5. The method of claim 1, wherein the complete combined final set of weights maps weight pairs $(x, x_{n+1})$ to a final weight (w), wherein the final weights are selected such that a combination of weights (w, w) has a same percentage of right and wrong images as a combination $(x, x_{n+1})$, and wherein correspondences $(x, x_{+1})$–w are selected based on a technique that maintains a percentage of right and wrong images associated with each weight pair; where x is the interim weight, and $x_{+1}$ the weight output by the classifier of the second type.

6. The method of claim 1, wherein the classifier of the second type is a structure classifier.

7. The method of claim 1, wherein the preliminary training process comprises selecting the weight coefficients which best distinguish images of the character (for which weight coefficients are being selected) from other images.

8. The method of claim 7, wherein the weight coefficients are selected on a basis of searching an extremum of a function, which distinguishes the images as a hyperplane.

9. The method of claim 8, wherein the function is expressed as $f = \sum_j x_j^2 + \sum_j (1-y_j)^2$, where $x_j = \sum_{i=1}^n a_i x_{ji}$, $y_j = \sum_{i=1}^n a_i y_{ji}$, ##EQU00008## and a.sub.i are weight coefficients, x.sub.ji is the set of all weights for a character j generated by each classifier i=1 to n by comparing with right character images, and y.sub.ji is the set of all weights for the same character j generated by each classifier i=1 to n by comparing with wrong character images.

10. An optical character recognition (OCR) system comprising:
at least one memory; and
at least one processor controlled by stored programmed instructions in the at least one memory that cause the OCR system to:
train each of a plurality of classifiers by selecting separately for each of a plurality of characters weight coefficients for a weighted mean;
recognize an input character based on the plurality of classifiers;
generate an output from each classifier by comparing the input character with a plurality of trained patterns;
group the plurality of classifiers based on a classifier grouping criterion; and
combine the output of each of the plurality of classifiers based on the grouping, wherein combining the output of classifiers further comprises:
combining a weight output by each classifier of at least one same type group into at least one interim weight in accordance with a formula for a weighted mean,
using a formula for calculating the weighted mean which is selected for each character on a basis of a preliminary training process based upon the plurality of training patterns, and
subsequently combining the interim weights from the calculated weighted mean with corresponding determined classifiers so as to provide a complete combined final set of weighted classifiers.

11. The OCR system of claim 10, wherein the classifier grouping criterion includes a measure of a similarity between the classifiers.

12. The OCR system of claim 10, wherein the classifier of the second type is a structure classifier.

13. The OCR system of claim 10, wherein the combining comprises a second stage in which each interim weight is combined with one of a further weight output by a classifier of a second type and another interim weight.

14. The OCR system of claim 13, wherein the second stage is performed multiple times in which case for each additional time, the interim weight is the output of a last performance of the second stage.

15. The OCR system of claim 13, wherein the complete combined final set of weights maps weight pairs $(x, x_{n+1})$ to a final weight (w), wherein the final weights are selected such that a combination of weights (w, w) has a same percentage of right and wrong images as a combination $(x, x_{n+1})$, and wherein correspondences $(x, x_{n+1})$–w are selected based on a technique that maintains a percentage of right and wrong images associated with each weight pair; where x is the interim weight, and $x_{n+1}$ is the weight output by the classifier of the second type.

16. The OCR system of claim 10, wherein the preliminary training process includes selecting the weight coefficients which best distinguish images of the character (for which weight coefficients are being selected) from other images.

17. The OCR system of claim 16, wherein the weight coefficients are selected on a basis of searching an extremum of a function, which distinguishes the images as a hyperplane.

18. The OCR system of claim 17, wherein the function is expressed as $f = \sum_j x_j^2 + \sum_j (1-y_j)^2$, where $x_j = \sum_{i=1}^n a_i x_{ji}$, $y_j = \sum_{i=1}^n a_i y_{ji}$, ##EQU00009## and a.sub.i are weight coefficients, x.sub.ji is the set of all weights for a character j generated by each classifier i=1 to n by comparing with right character images, and y.sub.ji is the set of all weights for the same character j generated by each classifier i=1 to n by comparing with wrong character images.

19. A computer readable medium having stored thereon a sequence of instructions which when executed by a computer, causes the computer to perform a method for an Optical Character Recognition (OCR) system, the method comprising:
training each of a plurality of classifiers by selecting separately for each of a plurality of characters weight coefficients for a weighted mean;
recognizing an input character based on the plurality of classifiers;
generating from each classifier an output by comparing the input character with a plurality of trained patterns;
grouping the plurality of classifiers based on a classifier grouping criterion; and
combining the output of each of the plurality of classifiers based on the grouping, wherein combining the output of classifiers comprises:
combining a weight output by each classifier of at least one same type group into at least one interim weight in accordance with a formula for a weighted mean,
using a formula for calculating the weighted mean which is selected for each character on a basis of a preliminary training process based upon the plurality of training patterns, and
subsequently combining the interim weights from the calculated weighted mean with corresponding determined classifiers so as to provide a complete combined final set of weighted classifiers.

20. The computer readable medium of claim 19, wherein the classifier grouping criterion includes a measure of a similarity between the classifiers.

21. The computer readable medium of claim 19, wherein the combining a weight output by each classifier of at least one same type group into at least one interim weight in accordance with a formula for a weighted mean is performed as part of a first stage, wherein the interim weight is a final weight in a case of there being only one type group at the first stage and no second stage.

22. The computer readable medium of claim 19, wherein the complete combined final set of weights maps weight pairs $(x, x_{n+1})$ to a final weight (w), wherein the final weights are selected such that a combination of weights (w, w) has a same percentage of right and wrong images as a combination $(x, x_{n+1})$, and wherein correspondences $(x, x_{n+1})$–w are selected based on a technique that maintains a percentage of right and wrong images associated with each weight pair; where x is the interim weight, and $x_{n+1}$ is the weight output by the classifier of the second type.

23. The computer readable medium of claim 19, wherein the combining comprises a second stage in which each interim weight is combined with one of a further weight output by a classifier of a second type and another interim weight.

24. The computer readable medium of claim 23, wherein the second stage is performed multiple times in which case for each additional time, the interim weight is the output of a last performance of the second stage.

25. The computer readable medium of claim 24, wherein the classifier of the second type is a structure classifier.

26. The computer readable medium of claim 19, wherein the preliminary training process comprises selecting the weight coefficients which best distinguish images of the character (for which weight coefficients are being selected) from other images.

27. The computer readable medium of claim 26, wherein the weight coefficients are selected on a basis of searching an extremum of a function, which distinguishes the images as a hyperplane.

28. The computer readable medium of claim 27, wherein the function is expressed as $f = j \times j2 + j(1-yj)2$, where $xj = i = 1 n a i x j i$, $yj = i = 1 n a i y j i$, ##EQU00010## and $a_i$ are weight coefficients, $x_{ji}$ is the set of all weights for a character j generated by each classifier i=1 to n by comparing with right character images, and $y_{ji}$ is the set of all weights for the same character j generated by each classifier i=1 to n by comparing with wrong character images.

* * * * *

UNITED STATES PATENT AND TRADEMARK OFFICE
CERTIFICATE OF CORRECTION

PATENT NO. : 8,660,371 B2
APPLICATION NO. : 12/775445
DATED : February 25, 2014
INVENTOR(S) : Diar Tuganbaev It is certified that error appears in the above-identified patent and that said Letters Patent is hereby corrected as shown below:

IN THE CLAIMS

The exact claim and line number where the errors in the issued patent are:

Claim 9, Column 11, Lines 27 and 28

Delete "f=j×j2+j(1-yj)2, where xj=i=1naixji, yj=i=1naiyji, ##EQU00008## and a.sub.i" and insert --
$$f = \sum_j x_j^2 + \sum_j \left(1 - y_j\right)^2, \text{where } x_j = \sum_{i=1}^n a_i x_{ji}, \; y_j = \sum_{i=1}^n a_i y_{ji}, \text{ and } a_i$$
--, therefor

Claim 9, Column 11, Line 28

Delete "x.sub.ji" and insert -- $x_{ji}$ --, therefor

Claim 9, Column 11, Line 31

Delete "y.sub.j" and insert -- $y_{ji}$ --, therefor

Claim 18, Column 12, Lines 29 and 30

Delete "f=j×j2+j(1—yj)2, where xj=i=1naixji, yj=i=1naiyji, ##EQU00009## and a.sub.i" and insert --
$$f = \sum_j x_j^2 + \sum_j \left(1 - y_j\right)^2, \text{where } x_j = \sum_{i=1}^n a_i x_{ji}, \; y_j = \sum_{i=1}^n a_i y_{ji}, \text{ and } a_i$$
--, therefor Signed and Sealed this
Seventh Day of October, 2014

Michelle K. Lee
*Deputy Director of the United States Patent and Trademark Office*

Claim 18, Column 12, Line 31

Delete "x.sub.ji" and insert -- $x_{ji}$ --, therefor

Claim 18, Column 12, Line 33

Delete "y.sub.j" and insert -- $y_{ji}$ --, therefor

Claim 28, Column 14, Lines 15 and 16

Should read:
$$f = \sum_j x_j^2 + \sum_j (1 - y_j)^2, \text{ where } x_j = \sum_{i=1}^{n} a_i x_{ji}, \ y_j = \sum_{i=1}^{n} a_i y_{ji}, \text{ and } a_i$$
--, therefor

Claim 28, Column 14, Line 17

Delete "x.sub.ji" and insert -- $x_{ji}$ --, therefor

Claim 28, Column 14, Line 19

Delete "y.sub.j" and insert -- $y_{ji}$ --, therefor